(12) United States Patent
Mok et al.

(10) Patent No.: US 8,515,407 B1
(45) Date of Patent: Aug. 20, 2013

(54) REDIRECTING INCOMING PHONE CALLS

(75) Inventors: Vinson Mok, Sunnyvale, CA (US); Juan Vasquez, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/615,477

(22) Filed: Sep. 13, 2012

Related U.S. Application Data

(60) Provisional application No. 61/613,805, filed on Mar. 21, 2012.

(51) Int. Cl.
*H04M 3/42* (2006.01)
(52) U.S. Cl.
USPC .......... 455/417; 455/41.1; 455/41.2; 455/445
(58) Field of Classification Search
USPC .................. 455/41.1, 41.2, 417, 445
See application file for complete search history.

(56) References Cited

U.S. PATENT DOCUMENTS

| | | | |
|---|---|---|---|
| 7,295,118 | B2 | 11/2007 | Jessup et al. |
| 7,957,518 | B2 | 6/2011 | Erb |
| 2002/0068575 | A1 | 6/2002 | Agrawal et al. |
| 2006/0223511 | A1 | 10/2006 | Hagale et al. |
| 2008/0292074 | A1 | 11/2008 | Boni et al. |
| 2011/0070828 | A1 | 3/2011 | Griffin et al. |
| 2011/0177818 | A1 | 7/2011 | Heit et al. |

OTHER PUBLICATIONS

"What can NFC do? RIM, NFCLauncher—p. 7—BlackBerry Forums at Crackberry.com," retrieved from http://forums.crackberry.com/blackberry-bold-9930-9900-f235/what-can-nfc-do-rim-nfcl . . . , accessed on Oct. 20, 2011, 10 pp.
YouTube, NFCLauncher—YouTube, retrieved from http://www.youtube.com/watch?v=GqD_oINY8Js, accessed on Oct. 20, 2011, 2 pp.
U.S. Appl. No. 13/645,210, by Kyle Williams, filed Oct. 4, 2012.
Office Action from U.S. Appl. No. 13/645,210, dated Dec. 7, 2012, 16 pp.
Response to Office Action dated Dec. 7, 2012, from U.S. Appl. No. 13/645,210, filed Mar. 7, 2013, 10 pp.

*Primary Examiner* — Temica M Beamer
(74) *Attorney, Agent, or Firm* — Shumaker & Sieffert, P.A.

(57) ABSTRACT

In general, this disclosure describes techniques for using short-range wireless communication to automatically configure a telephony service to direct phone calls to one or more different devices. For example, a first device obtains configuration information associated with a second device from the second device using short-range wireless communication. The first device sends a first message, which includes at least a subset of the configuration information, to a telephone call controller to configure incoming phone calls to be routed to at least the second device. The first device determines that the second device is no longer reachable by the first device using the short-range wireless communication to the second device, and sends a second message to the telephone call controller to configure incoming phone calls to not be routed to the second device.

20 Claims, 4 Drawing Sheets

REDIRECTING INCOMING PHONE CALLS

RELATED APPLICATION

This application claims the benefit of priority to Provisional Application No. 61/613,805, filed Mar. 21, 2012, which is assigned to the assignee hereof and is hereby expressly incorporated by reference herein.

TECHNICAL FIELD

This disclosure relates to electronic devices and, more specifically, to short-range communication of electronic devices.

BACKGROUND

A user may distribute a single telephone number as contact information and associate the phone number with different devices at different times based on which devices the user may have access to at the particular time (e.g., work telephone, home telephone, cellular telephone, etc.). Each of the different devices may have a different telephone number and may require configuration of a telephony service to be accessible using the single telephone number distributed by the user.

SUMMARY

In one example, a method includes obtaining, by a first device and from a second device, configuration information associated with the second device using short-range wireless communication, and sending, by the first device, a message to a telephone call controller indicating that the telephone call controller is to route incoming phone calls to at least the second device, wherein the message includes at least a subset of the configuration information associated with the second device. The method may further include determining that the second device is no longer reachable by the first device using the short-range wireless communication, and sending, by the first device and to the telephone call controller, a second message indicating that the telephone call controller is to refrain from routing incoming phone calls to the second device.

In another example, a computer-readable storage medium is encoded with instructions that, when executed, cause one or more processors of a device to perform operations that include, obtaining, by a first device and from a second device, configuration information associated with the second device using short-range wireless communication, and sending, by the first device, a message to a telephone call controller indicating that the telephone call controller is to route incoming phone calls to at least the second device, wherein the message includes at least a subset of the configuration information associated with the second device. The operations may further include determining that the second device is no longer reachable by the first device using the short-range wireless communication, and sending, by the first device and to the telephone call controller, a second message indicating that the telephone call controller is to refrain from routing incoming phone calls to the second device.

In another example a first device includes at least one processor, an interface configured to send and receive telephonic communications with another device during an active telephone call, and a short-range wireless communication interface that receives configuration information associated with a second device. The first device may further include a telephony server configuration module operable by the at least one processor to send a first message to a telephone call controller indicating that the telephone call controller is to route incoming phone calls to at least the second device, wherein the first message includes at least a subset of the configuration information associated with the second device. In addition, the device may determine that the second device is no longer reachable by the first device using the short-range wireless communication and send a second message to the telephone call controller indicating that the telephone call controller is to refrain from routing incoming phone calls to the second device.

The details of one or more embodiments are set forth in the accompanying drawings and the description below. Other features, objects, and advantages will be apparent from the description and drawings, and from the claims.

DETAILED DESCRIPTION

Figure 1:
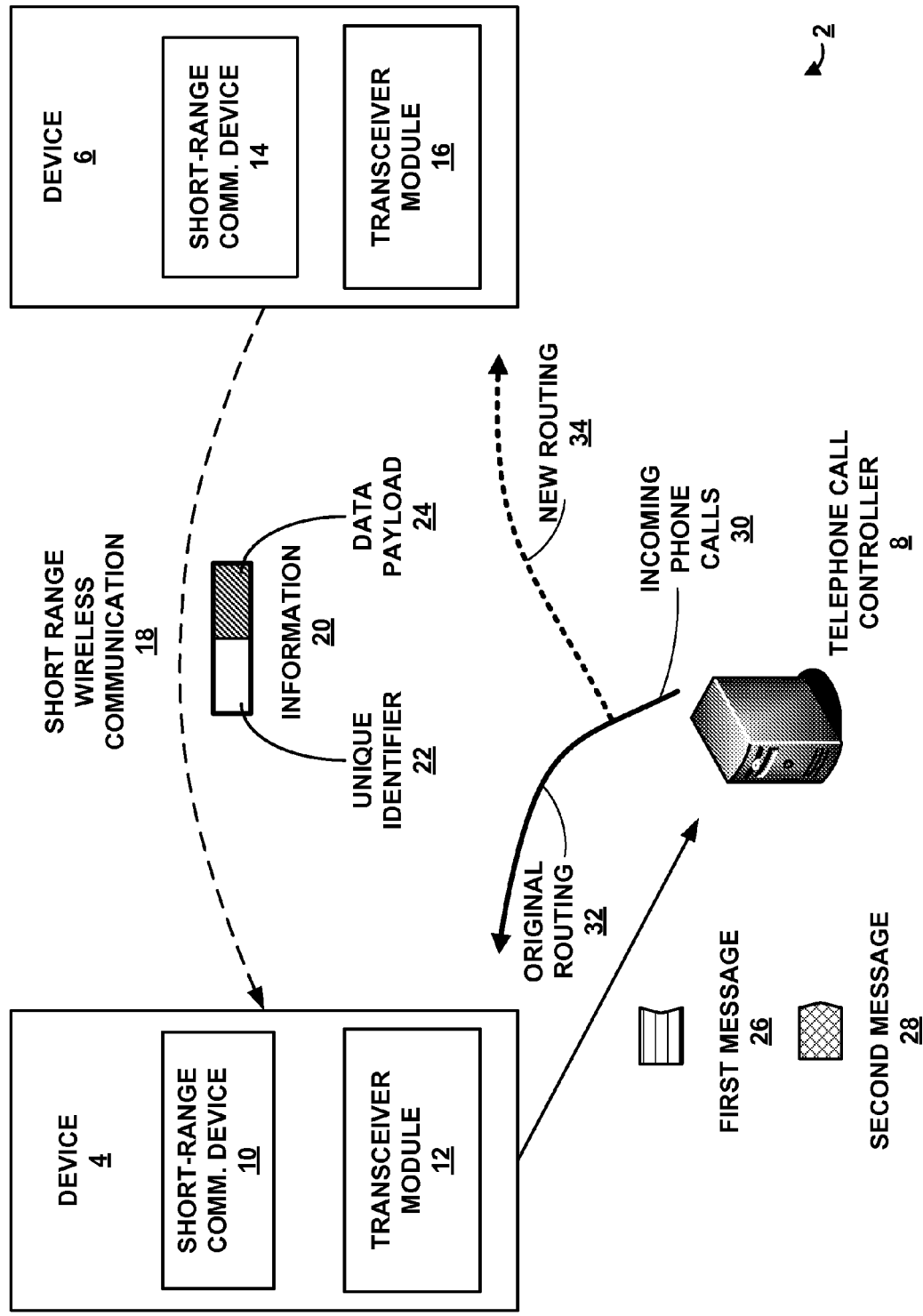
FIG. 1 is a conceptual diagram illustrating an example system for automatically configuring a telephone call controller to route incoming phone calls, in accordance with one or more aspects of the present disclosure.

Private telephony services (e.g., a Public Branch Exchange) may be configured to route incoming phone calls to a specified device by a user taking a number of steps via telephones, websites, or computing applications. For example, the user may be required to visit the website of the telephony service and log in to the site with a username and password. The user may then be required to navigate to a settings page and enter an already-known phone number of a telephone to which the user wishes to have incoming phone calls routed. Finally, the user may be required to confirm this change by answering a test call on the specified telephone. As another example, the user may be required to use a specified telephone to call an automated configuration line of the telephony service and navigate through a series of auditory menus in order to configure routing of incoming phone calls. Once the user has configured the service, incoming phone calls can be answered on the specified device. However, these methods of configuration may be time consuming and may require knowledge of the particular telephony system being used. Further, in order to configure the telephony service, a user must end any active telephone call, or take a number of steps to first transfer the call and then reconfigure the service.

Techniques of this disclosure may, in various instances, enable a first device (e.g., a smartphone) to obtain information from a short-range communication device (e.g., a near field communication (NFC) tag) associated with a second device (e.g., a landline telephone) to configure a telephone call controller (e.g., a telephony service) to direct incoming phone calls to the second device without requiring the user to undertake multiple steps to configure the service. For example, a telephony service may be pre-configured to direct all incoming phone calls for the user to a smartphone. When the user places the smartphone near an NFC tag, the smartphone may read from the NFC tag and receive configuration information associated with a landline telephone (e.g., a phone number or other unique identifier). The smartphone may then transmit the configuration information to the telephony service in order to modify the incoming call routing configuration of the telephony service. The user may then answer incoming phone calls on either the smartphone or the landline telephone. In the event there is an active telephone call on the smartphone when the telephony service receives the configuration information, the telephony service may first make a connection to the landline telephone, transfer the active telephone call to the landline telephone, disconnect the smartphone, and then modify the incoming call routing configuration.

If the user moves the smartphone, the smartphone may determine whether the telephony service needs to be reconfigured. For example, if the smartphone is moved away from the NFC tag such that the smartphone and NFC tag are no longer in close physical proximity, the smartphone may automatically detect this and determine that the telephony service needs to be reconfigured. To automatically determine that the smartphone is no longer in close physical proximity to the NFC tag, the smartphone may, periodically or upon an event, attempt to read from the NFC tag. If the smartphone cannot read from the NFC tag, the smartphone may determine that a user has moved the smartphone and send a message to reconfigure the telephony service to exclude the landline telephone. In the event there is an active telephone call on the landline telephone when the telephony service receives the reconfiguration message, the telephony service may make a phone connection to the smartphone, transfer the active telephone call to the smartphone, and disconnect the landline telephone, in addition to reconfiguring the telephony service. Thus, in various instances, the active call may be automatically transferred from the landline telephone to the smartphone upon the user moving the smartphone out of range of the NFC tag.

In this manner, the techniques of this disclosure provide a mechanism for routing incoming phone calls between devices. By utilizing short-range wireless identification devices to enact the routing changes, a user may not be required to perform multiple steps to enact the routing changes, to revert to the original settings, or to transfer an active call during routing changes. Rather, the techniques of this disclosure enable a user to direct incoming phone calls to any compatible device having a corresponding NFC tag and redirect calls back to any active NFC hardware-equipped phone or phones as described in this disclosure.

FIG. 1 is a conceptual diagram illustrating an example system 2 for automatically configuring a telephone call controller to route incoming phone calls, in accordance with one or more aspects of the present disclosure. System 2 includes devices 4 and 6 and telephone call controller 8 (e.g., a telephony service). Devices 4 and 6, in some examples, include or are part of a portable computing device (e.g., mobile phone, netbook, laptop, or tablet device), a desktop computer, a telephone, or other device capable of engaging in telephonic communication, including voice over Internet Protocol, plain old telephone server (POTS), and other forms of telephony. Telephone call controller 8, in some examples, may be a physical device, such as a computing device. In other examples, telephone call controller 8 may be a software application (e.g., program code) executable by one or more processors of a computing device.

In some examples, devices 4 and 6 include a respective short-range communication device 10 and 14. In one example, short-range communication devices 10, 14 are capable of short-range wireless communication 18 using a protocol such as Bluetooth® or Near Field Communication (NFC). In one example, short-range wireless communication 18 may include a short-range wireless communication channel. Short-range wireless communication 18, in some examples, includes wireless communication between devices 4 and 6 of within a particular distance. Exemplary distances include 100 meters, 10 meters, 5 meters, 0.1 meters, and 0.02 meters. Short-range communication devices 10, 14 may communicate, in one example, in a radio frequency band of 13.56 megahertz or similar, and may have a spectral envelope as wide as 1.8 megahertz. In some examples, a person and/or computing device may manually or automatically update information usable to identify each of devices 4, 6 when devices 4, 6 are programmable devices.

Short-range wireless communication 18, in some examples, includes two different modes of operation. For example, short-range wireless communication 18 may include an active mode and a passive mode of operation. In an active mode of operation, device 4 may generate a first radio field that is received by device 6 in physical proximity to device 4. In response, device 6 may generate a second radio field that is received by short-range communication device 10. In this way, data may be communicated between device 4 and device 6, such as using peer-to-peer communication.

In a passive mode of operation, load modulation techniques may be employed to facilitate data communication between device 4 and device 6. In a passive mode, device 6 does not generate a radio field in response to the radio field of short-range communication device 10. Instead, device 6 may include electrical hardware that generates a change in impedance in response to a radio field. For example, short-range communication device 10 may generate a radio field that is received by device 6. Electrical hardware in device 6 may generate a change in impedance in response to the radio field. The change in impedance may be detected by short-range communication device 10. In this way, load modulation techniques may be used by device 4 to receive information from device 6. Other well-known modulation techniques including phase modulation and/or amplitude modulation may also be employed to facilitate data communication between device 4 and device 6.

Device 6 may include a short-range communication device 14 that is similar to short-range communication device 10 of device 4. In other examples, short-range communication device 14 may be a tag that stores identification information that uniquely identifies device 6. In some examples, short-range communication device 14 may be attached to or a part of device 6. In other examples, short-range communication device 14 may be not be attached to or otherwise be physically separate from device 6.

Device 4 may receive information 20 from short-range communication device 14 in response to receiving a radio field generated by short-range communication device 10. Information 20 may include data payload 24 that includes data stored and/or generated by device 6. In some examples, data payload 24 may include information usable to configure a telephone call controller 8. In other examples, data payload 24 may also include information usable to connect device 6 to an active telephone call that includes device 4. Information 20 may also include a unique identifier 22. In one example, unique identifier 22 may include data, such as a serial number, telephone number, network hardware address, or other data that uniquely identifies device 6. For example, where two or more devices are present, each device may be uniquely identified by a unique identifier.

In one example, telephone call controller 8 is configured to direct incoming phone calls 30 to device 4 in accordance with original routing 32. In other examples, original routing 32 may direct calls to device 4 as well as one or more other devices. During calls, device 4 may exchange telephonic communications with another device using transceiver module 12. Transceiver module 12, in some examples, is communicatively coupled to telephone call controller 8. When sending telephonic communications to the other device, transceiver module 12 may send the telephonic communications to telephone call controller 8, which then forwards the telephonic communications to the other device.

Telephone call controller 8 provides the functionality to connect, maintain, and disconnect telephone calls between devices. In various embodiments, telephone call controller 8 may include hardware elements, software elements, or a combination thereof. Telephone call controller 8 may support one or more different communication mechanisms including public switched telephone network (PSTN), voice over Internet Protocol (VOIP), and integrated services digital network (ISDN). The functionality of telephone call controller 8 may be distributed between two or more different telephony servers. In some examples, telephone call controller 8 may be physically located within a telecommunications provider network and may be provided and maintained by the telecommunications provider. Telephone call controller 8 is one example of a telephony server.

In accordance with techniques of this disclosure, a user of device 4 may cause incoming phone calls 30, routed to at least device 4 in accordance with original routing 32, to be routed to device 6 in accordance with both original routing 32 and new routing 34, using short-range communication devices 10 and 14. When participating in an active telephone call on device 4, the user of device 4 may additionally cause the transfer of the active telephone call from device 4 to device 6. An active telephone call includes an incoming or an outgoing phone call to which a device is currently connected (e.g., using telephone call controller 8). For example, an incoming phone call of device 4 is a phone call that does not originate from device 4. Rather, an incoming phone call is a phone call that was initiated by a different device by at least calling device 4. An outgoing phone call of device 4 is a phone call that originates from device 4. That is, device 4 initiates the outgoing phone call by dialing a different device.

In one example, short-range communication device 14 includes passive NFC hardware elements programmed with information that identifies device 6. The passive NFC hardware, in various instances, may include a sticker attached to or located near device 6 or active NFC hardware emulating passive NFC hardware (i.e., operating in a passive NFC hardware emulation mode). The user may initiate the rerouting of incoming phone calls 30 by placing device 4 on or next to short-range communication device 14. Additionally, if device 4 is connected to an active telephone call while placing device 4 on or next to short-range communication device 14, the user may also initiate the transfer of the active telephone call from device 4 to device 6. In one example, placing device 4 may include physical contact between device 4 and short-range communication device 14. In another example, the placement may include moving device 4 within close physical proximity of short-range communication device 14, such as within twenty centimeters or less of short-range communication device 14. While described as a user placing the device that is currently the configured recipient of incoming phone calls 30 (e.g., device 4) on or next to the short-range communication device of a device not a configured recipient (e.g., of device 6), the present disclosure contemplates the user placing the short-range communication device of a device not a currently configured recipient of incoming phone calls 30 (e.g., of device 6) on or next to the device that is a configured recipient (e.g., device 4). The devices may send and/or receive configuration information in a manner similar to the techniques described in the present disclosure.

Upon the user placing device 4 on or next to short-range communication device 14, short-range wireless communication 18 may be initiated. In various instances, the user may be provided an option not to initiate short-range wireless communication 18 or otherwise prevent an unwanted transfer of a call. For example, a graphical user interface may be presented to the user requesting confirmation of the pending call transfer. In one example, short-range wireless communication 18 is initiated when short-range communication device 10 generates a radio field. Short-range communication device 14 may activate upon detecting the radio field emitted by short-range communication device 10 and modulate the radio field. By modulating the radio field, short-range communication device 14 may transfer information stored or encoded within short-range communication device 14 (e.g., information 20) to short-range communication device 10 of device 4.

Short-range communication device 10 receives information 20 from device 6 and short-range communication device 14. Unique identifier 22 of information 20 includes, as one example, a telephone number associated with device 6. As another example, unique identifier 22 may include telephone numbers of multiple devices. Device 4 may send a first message 26 to telephone call controller 8 indicating that telephone call controller 8 is to begin routing all incoming phone calls 30 to device 6. In other instances, message 26 may indicate that telephone call controller 8 is to begin routing all incoming phone calls 30 to multiple devices. That is, in one example, incoming phone calls 30 would be routed in accordance with new routing 34 as well as original routing 32. In another example, first message 26 may indicate that telephone call controller 8 is to configure incoming phone calls 30 to be routed only in accordance with new routing 34, excluding device 4. The first message 26 may also indicate that telephone call controller 8 is to connect device 6 to the active telephone call in which device 4 is participating and then disconnect device 4 from the active telephone call. First message 26 may include the telephone number, Media Access Control (MAC) address, or Internet Protocol (IP) address of device 6 received by short-range communication device 10 from short-range communication device 14 using short-range wireless communication 18.

Telephone call controller 8 receives first message 26 and, in one example, may reconfigure itself to route incoming phone calls 30 to device 6. Telephone call controller 8 may also reconfigure itself to cease routing incoming phone calls 30 to device 4. In other examples, telephone call controller 8 may reconfigure itself to route incoming phone calls 30 to multiple devices. Further, if device 4 is part of an active telephone call, the telephone call controller 8 may call the telephone number of device 6 in order to attempt to connect device 6 to the active telephone call. In some examples, upon successfully connecting device 6 to the active telephone call, telephone call controller 8 may automatically disconnect device 4 from the active telephone call. Upon receiving incoming phone calls 30, both device 4 and device 6 may ring, allowing the user to answer incoming phone calls 30 on either device 4 or device 6. In one instance, only device 6 may ring. In another instance, device 6 as well as other devices may ring. In some examples, upon successfully reconfiguring itself, the telephone call controller 8 may send device 4 a message indicating that incoming phone calls 30 will thereafter be additionally routed to device 6. Upon receiving the message from telephone call controller 8, device 4 may alert the user that incoming phone calls 30 will thereafter additionally be routed to device 6. In other examples, where incoming phone calls 30 were not successfully rerouted by telephone call controller 8 to device 6 additionally, device 4 may display a message to the user indicating the failed connection attempt and the user may retry the rerouting of incoming phone calls 30.

In some examples, once telephone call controller 8 has successfully rerouted incoming phone calls 30 to device 6 additionally, device 4 may initiate checks to determine whether device 4 is still in proximity with short-range communication device 14. As one example, device 4 may periodically reactivate short-range communication device 10 to read from short-range communication device 14 similar to the techniques described in the present disclosure. If short-range communication device 10 cannot read from short-range communication device 14, device 4 may determine that short-range communication device 14 is no longer in physical proximity to short-range communication device 10.

When device 4 determines that short-range communication device 14 is no longer in proximity, device 4 may send a second message 28 to telephone call controller 8 indicating that telephone call controller 8 is to cease routing incoming phone calls 30 to device 6. That is, second message 28 may instruct telephone call controller 8 to no longer route incoming phone calls 30 in accordance with new routing 34. Instead, second message 28 may instruct telephone call controller 8 to route incoming phone calls 30 in accordance with original routing 32. In some examples, message 28 may also instruct telephone call controller 8 to check whether device 6 is participating in an active telephone call.

In other examples, a user of device 4 may initiate the generation and sending of second message 28 by activating (e.g., pushing, touching, clicking, selecting, etc.) a hardware or software button of device 4. Device 4 receives an indication that the hardware or software button was activated and may, in response, generate and send second message 28 to telephone call controller 8 in a substantially similar manner to the manner described with respect to device 4 determining that short-range communication device 14 is no longer in physical proximity to short-range communication device 10.

Upon receiving second message 28, telephone call controller 8 may reconfigure itself to no longer route incoming phone calls 30 to device 6. In examples where device 6 is participating in an active telephone call when telephone call controller 8 receives second message 28, telephone call controller 8 may connect device 4 to the active telephone call in addition to rerouting incoming phone calls 30. In examples where original routing 32 routes incoming phone calls 30 to one or more other devices in addition to device 4, telephone call controller 8 may attempt to connect the device that sent second message 28 (e.g., device 4) to the active telephone call. In some examples, upon successfully connecting device 4 to the active telephone call, telephone call controller 8 may automatically disconnect device 6 from the active telephone call. When receiving incoming phone calls 30, device 4 may ring, allowing the user to answer incoming phone calls 30 on device 4. In those examples where original routing 32 routes incoming phone calls 30 to one or more other devices in addition to device 4, the user may be allowed to answer incoming phone calls 30 on any of the devices included by original routing 32. In various instances, upon successfully reconfiguring itself, the telephone call controller 8 may send device 4 a message indicating that incoming phone calls 30 will thereafter no longer be routed to device 6. Upon receiving the message from telephone call controller 8, device 4 may alert the user that incoming phone calls 30 will thereafter no longer be routed to device 6.

In this manner, techniques of this disclosure may provide a mechanism for configuring a telephone call controller (e.g., a telephony server) to route incoming phone calls to different devices without requiring any of the devices to be preconfigured with information about the other devices. By utilizing NFC to transfer configuration information from an additional device, a user may not be required to determine and input identification information associated with the additional device. That is, by automatically obtaining and sending configuration information to a telephone call controller, the user may not be required to perform multiple steps to reroute incoming phone calls and possibly transfer active telephone calls. Instead, the user may be able to place one device on or next to another device to automatically reroute telephone calls and, in the event there is an active telephone call, connect one of the devices to the active telephone call.

Figure 2:
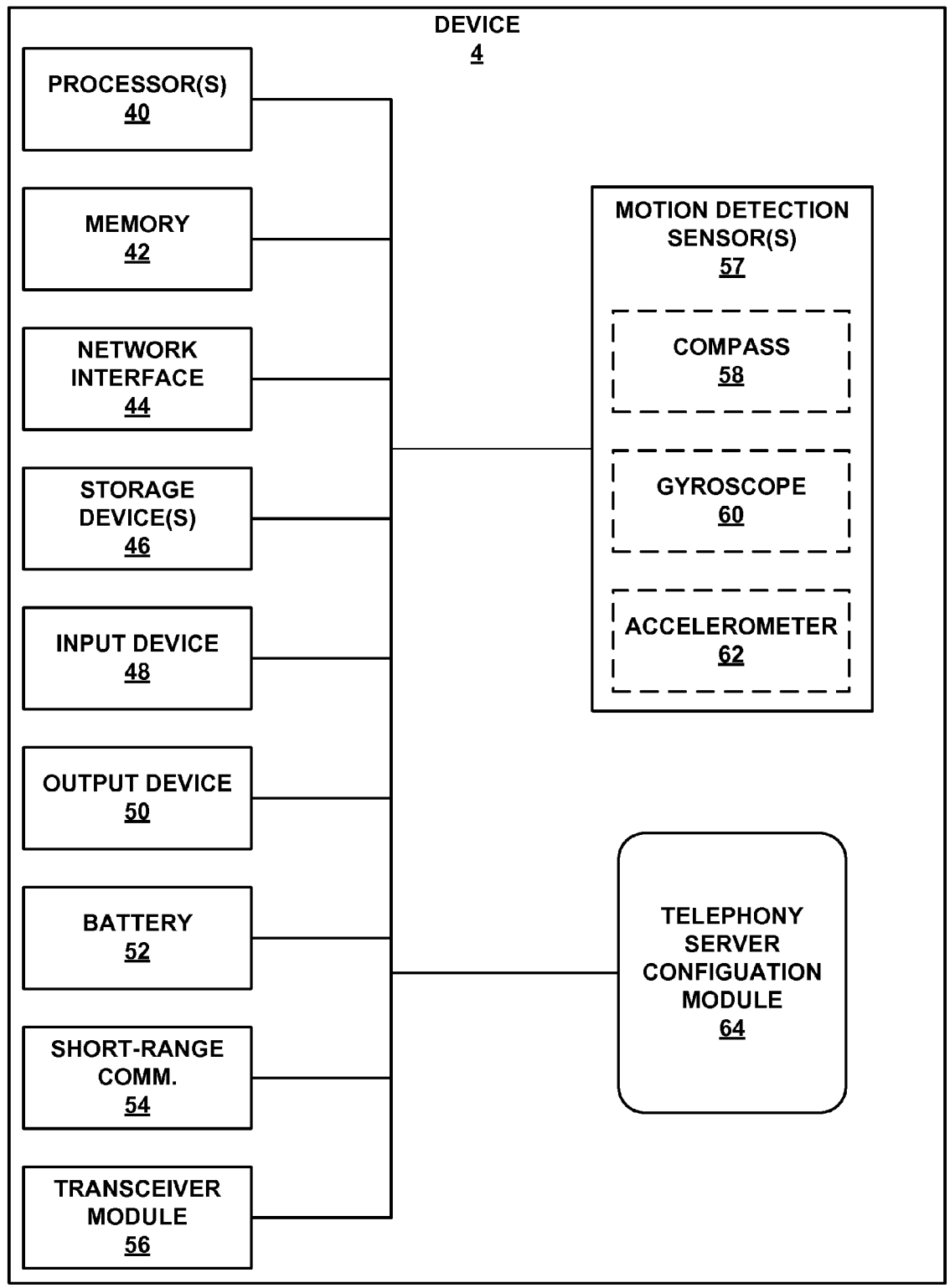
FIG. 2 is a block diagram illustrating further details of one example of a device shown in FIG. 1, in accordance with one or more aspects of the present disclosure.

FIG. 2 is a block diagram illustrating further details of one example of a device 4 shown in FIG. 1, in accordance with one or more aspects of the present disclosure. FIG. 2 illustrates only one particular example of device 4, and many other example embodiments of device 4 may be used in other instances.

As shown in the specific example of FIG. 2, device 4 includes one or more processors 40, memory 42, a network interface 44, one or more storage devices 46, input device 48, output device 50, battery 52, short-range communication interface 54, transceiver module 56, and motion detection sensor(s) 57 that may include one or more of compass 58, gyroscope 60, and accelerometer 62. In other examples, motion detection sensor(s) 57 can include other sensing devices. Device 4, in one example, further includes a telephony server configuration module 64. Telephony server configuration module 64 is executable by device 4 (e.g., executable by one or more of processors 40). Each of components 40, 42, 44, 46, 48, 50, 52, 54, 56, and 57 may be interconnected (physically, communicatively, and/or operatively) for inter-component communications.

Processors 40, in one example, are configured to implement functionality and/or process instructions for execution within device 4. For example, processors 40 may be capable of processing instructions stored in memory 42 or instructions stored on storage devices 46.

Memory 42, in one example, is configured to store information within device 4 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the device is turned off. Examples of volatile memories include random access memories (RAM), dynamic random access memorize (DRAM), static random access memories (SRAM), and other forms of volatile memories known in the art. In some examples, memory 42 is used to store program instructions for execution by processors 40. Memory 42, in one example, is used by software or applications running on device 4 to temporarily store information during program execution.

Storage devices 46, in some examples, also include one or more computer-readable storage media. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

Device 4, in some examples, also includes a network interface 44. Device 4, in one example, utilizes network interface 44 to communicate with external devices via one or more networks, such as one or more wired or wireless networks. Network interface 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, device 4 utilizes network interface 44 to wirelessly communicate with an external device such as a server, mobile phone, or other networked computing device.

Input device 48, in some examples, is configured to receive input from a user through tactile, audio, or video feedback. Examples of input device 48 include a touch-sensitive and/or a presence-sensitive screen, mouse, a keyboard, a voice responsive system, or any other type of device for detecting a command from a user. In some examples, input device 48 includes a touch-sensitive screen, mouse, keyboard, microphone, or video camera.

One or more output devices 50 may also be included in device 4. Output device 50, in various instances, is configured to provide output to a user using tactile, audio, or video stimuli. Examples of output device 50 may include a touch-sensitive screen, sound card, a video graphics adapter card, or any other type of device for converting a signal into an appropriate form understandable to humans or machines. Additional examples of output device 50 may include a speaker, a cathode ray tube (CRT) monitor, a liquid crystal display (LCD), or any other type of device that can generate intelligible output to a user.

Device 4, in some examples, includes one or more batteries 52, which may be rechargeable and provide power to device 4. Battery 52, in some examples, is made from nickel-cadmium, lithium-ion, or other suitable material.

Device 4, in some examples, includes one or more short-range communication interfaces 54. For example, short-range communication device 10 of FIG. 1 may be a short-range communication interface 54. In some examples, short-range communication interface 54 communicates wirelessly with other devices in physical proximity to short-range communication interface 54 (e.g., approximately 0-100 meters). In other examples, short-range communication interface 54 reads a tag, e.g., an RFID tag, via a radio frequency signal. Some examples of short-range communication interface 54 include a Bluetooth®, Near-Field Communication, or Ultra-Wideband radio.

Transceiver module 56 may, in some examples, be communicatively coupled to telephone call controller 8 of FIG. 1. For example, transceiver module 12 of FIG. 1 may be a transceiver module 56. When device 4 sends telephonic communications to other devices, transceiver module 56 may send the telephonic communications to telephone call controller 8 of FIG. 1, which then forwards the telephonic communications to the other devices.

Motion detection sensor(s) 57, in some examples, include at least one compass 58. Compass 58, in some examples, may determine a magnetic bearing relative to a magnetic field (e.g., the magnetic field of the Earth). Compass 58, in various instances, may detect movement of device 4 relative to the magnetic field. In one example, compass 58 may be used in determining whether device 4 is still in close proximity to short-range communication device 14 of FIG. 1. Instead of or in addition to short-range communication interface 54 (e.g., short-range communication device 10 of FIG. 1) activating periodically, compass 58 may trigger short-range communication interface 54 to activate upon movement and check the proximity of short-range communication device 14. In other words, when compass 58 detects a change in the magnetic field, compass 58 may communicate with short-range communication interface 54 in order to inform short-range communication interface 54 of movement.

Gyroscope 60, in some examples, may be one of motion detection sensor(s) 57 and determine movement in at least one dimension of three-dimensional space. Gyroscope 60 may accomplish such a determination of movement by tracking angular momentum. By detecting movement of device 4, gyroscope 60 may aid in determining whether device 4 is still in close proximity to short-range communication device 14. For example, gyroscope 60 may trigger short-range communication interface 54 to activate upon movement and check the proximity of short-range communication device 14. In other words, when gyroscope 60 detects a change in angular momentum, gyroscope 60 may send a message to short-range communication interface 54 in order to cause short-range communication interface 54 to active and determine if short-range communication device 14 is readable by short-range communication interface 54.

Motion detection sensor(s) 57, in some examples, include at least one accelerometer 62. Accelerometer 62, in various instances, may determine proper acceleration in at least one dimension of three-dimensional space. In one example, accelerometer 62 may be used in determining whether device 4 is still in close proximity to short-range communication device 14. Accelerometer 62 may trigger short-range communication interface 54 to activate upon movement and check whether short-range communication device 14 is readable by short-range communication interface 54. In other words, when accelerometer 62 detects a change in proper acceleration, accelerometer 62 may send a message to short-range communication interface 54 in order to cause short-range communication interface 54 to active and determine if short-range communication device 14 is readable by short-range communication interface 54.

Device 4, in some examples, further includes telephony server configuration module 64. Telephony server configuration module 64, in some examples, includes instructions that, when executed on device 4, cause device 4 to perform the operations and actions described in FIGS. 1-4. For example, in FIG. 1, when information 20 is received by short-range communication device 10, this information 20 may be communicated to the telephony server configuration module 64 of FIG. 2. Telephony server configuration module 64 may, in various instances, determine whether device 4 is engaged in an active telephone call. In some examples telephony server configuration module 64 may determine whether device 4 is engaged in an active telephone call upon receiving communication from device 4. In other examples, telephony server configuration module 64 may determine whether device 4 is engaged in an active telephone call after receiving information 20.

Upon receiving information 20, telephony server configuration module 64 may send first message 26 to telephone call controller 8. As one example, telephony server configuration module 64 may communicate with network interface 44 to send first message 26. First message 26 may contain at least a part of information 20. In some examples, first message 26 may contain information relating to whether or not device 4 is engaged in an active telephone call. First message 26 may also contain information relating to the active telephone call.

In response to sending first message 26, telephony server configuration module 64 may receive a message from telephone call controller 8 specifying that routing configuration of the telephone call controller 8 has been changed. Telephony server configuration module 64 may alternatively receive a message from telephone call controller 8 indicating that an attempt to change the routing configuration has failed. In various instances, upon receiving a message from telephone call controller 8, telephony server configuration module 64 may notify the user. For example, when telephony server configuration module 64 receives a message from telephone call controller 8 specifying that the routing configuration of the telephone call controller 8 has been changed (e.g., now in accordance with new routing 34), telephony server configuration module 64 may interact with one or more output devices 50 to notify the user that incoming phone calls 30 are also being routed to device 6.

Furthermore, telephony server configuration module 64 may, in some examples, periodically communicate with short-range communication device 10 to determine whether short-range communication devices 10, 14 are able to interact. Telephony server configuration module 64 may also communicate with motion detection sensor(s) 57 such as compass 58, gyroscope 60, or accelerometer 62. In some instances, telephony server configuration module 64 may receive information indicating that device 4 has moved. Upon receiving the information, telephony server configuration module 64 may communicate with short-range communication device 10 to determine whether short-range communication devices 10, 14 are able to interact. If short-range communication devices 10, 14 are unable to interact, telephony server configuration module 64 may determine that short-range communication devices 10, 14 are no longer in physical proximity.

Telephony server configuration module 64 may also receive a message from one or more input devices 48 based on user input. For example, a user may interact with device 4, such as by pressing a hardware button, activating a graphical button displayed by output device 50, or entering text, to cause telephony server configuration module 64 receive a command indicating that the user would like to reconfigure the telephone routing configuration of telephone call controller 8.

Upon receiving user input or upon determining that short-range communication devices 10, 14 are no longer in physical proximity, telephony server configuration module 64 may send second message 28 to telephone call controller 8 to cause telephone call controller 8 to configure the routing of incoming phone calls to exclude device 6. In one example, telephony server configuration module 64 may send second message 28 by communicating with network interface 44. Subsequent to sending second message 28, telephony server configuration module 64 may receive a response from telephone call controller 8 confirming that the routing configuration of telephone call controller 8 has been modified.

Figure 3:
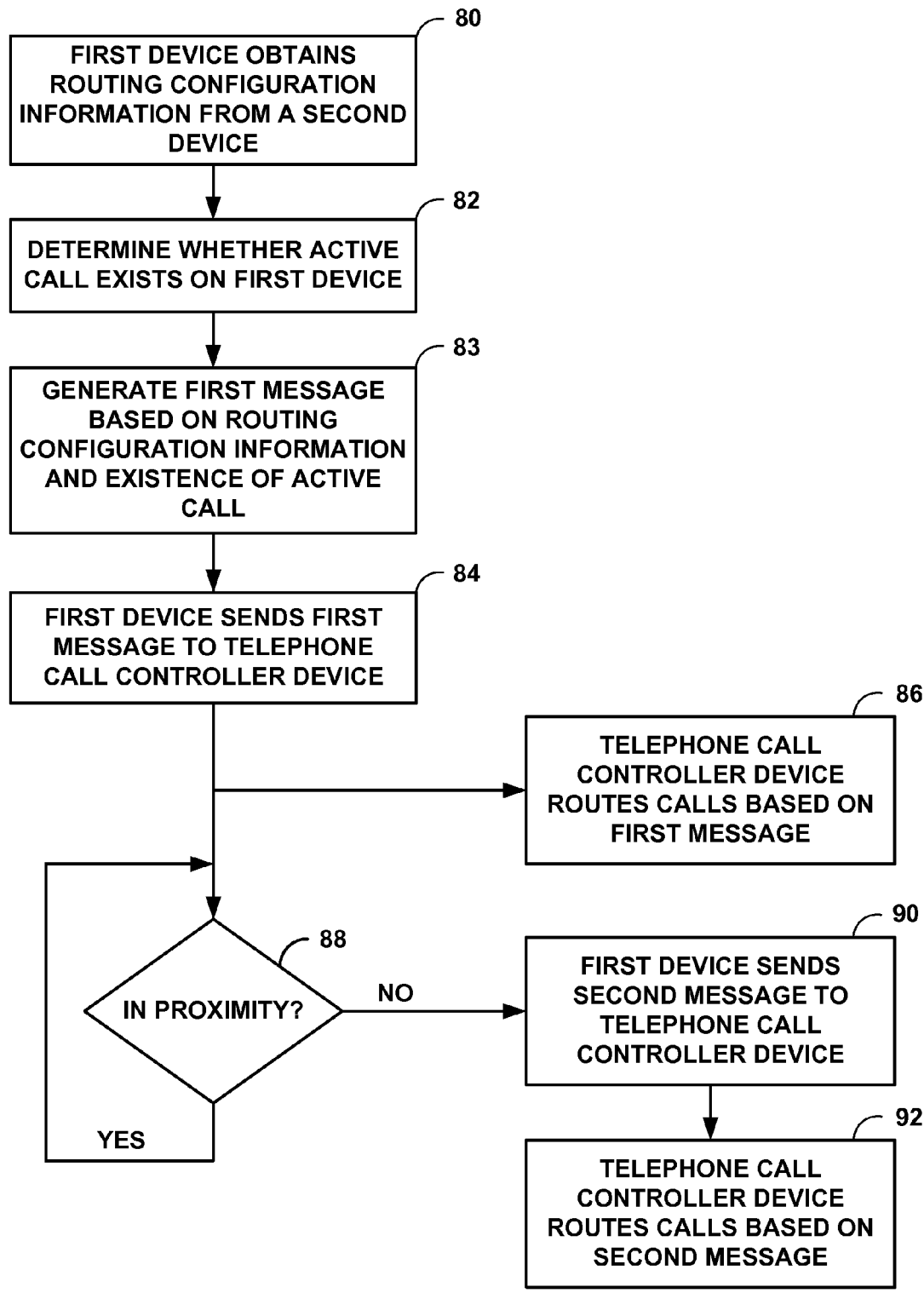
FIG. 3 is a flow diagram illustrating an example process for automatically configuring a telephone call controller to route incoming phone calls, in accordance with one or more aspects of the present disclosure.

FIG. 3 is a flow diagram illustrating an example process for automatically configuring a telephone call controller to route incoming phone calls, in accordance with one or more aspects of the present disclosure. FIG. 3 does not represent any requirement in the ordering of individual steps. For purposes of illustration only, the example method illustrated in FIG. 3 is described below within the context of system 2 of FIG. 1 and device 4 of FIG. 2.

While a telephone call controller 8 is configured to route incoming phone calls to device 4 or, in other examples, to device 4 as well as other devices, device 4 may obtain routing configuration information from a second device (e.g., device 6) (80). In one example, device 4 may obtain the routing configuration information using short-range wireless communication, such as NFC. In examples where device 4 includes active NFC hardware (e.g., short-range communication interface 54, or short-range communication device 10), device 4 may obtain the routing configuration information by, for example, activating the transfer of the routing configuration information using the active NFC hardware. The routing configuration information provided by the second device may, in some examples, be stored within the second device. In other examples, the routing configuration information of the second device may be stored in hardware placed on or near the second device and be uniquely associated with the second device. One such example may be routing configuration information contained in an NFC tag affixed on or near to the second device. In this example, device 4 may obtain the routing configuration information from the NFC tag. The routing configuration information may include an identifier for the second device (e.g., a telephone number, MAC address, IP address, etc.) or identifiers for multiple devices.

Device 4 may determine whether device 4 is connected to an active telephone call (82). Device 4 may, in some examples, check for a connection to telephone call controller 8 to determine whether device 4 is connected to an active telephone call (e.g., via transceiver module 12).

Responsive to obtaining the routing configuration information, device 4 may generate a first message based on the routing configuration information and whether or not the first device is connected to an active call (83). When device 4 is connected to or otherwise participating in an active call, the first message may include configuration information that requests telephone call controller 8 to transfer the active call from device 4 to device 6. For example, in addition to configuring the routing of incoming calls, the first message may instruct telephone call controller 8 to attempt to establish a telephonic connection with device 6 by initiating a telephone call to device 6. If successful, telephone call controller 8 may add device 6 to the active call. In some examples, once telephone call controller 8 has connected device 6 to the active call, telephone call controller 8 may then automatically disconnect device 4. When device 4 is not connected to an active call, the first message may include configuration information that instructs telephone call controller 8 to configure the routing of incoming phone calls. For example, the first message may instruct telephone call controller 8 to additionally route incoming phone calls for a specific telephone number to device 6 as well as device 4. In another example, the first message may instruct telephone call controller 8 to route incoming phone calls for a specific telephone number to device 6 while excluding device 4.

Device 4 may send the first message to a telephony service (e.g., telephone call controller 8) (84). Telephone call controller 8, in one example, may be a voice over Internet Protocol (VoIP) server. In another example, telephone call controller 8 may be a conventional telephony server. Telephone call controller 8 may be implemented in hardware, software, or some combination thereof. In response to receiving the first message from device 4, telephone call controller 8 may reconfigure the routing of incoming phone calls 30 based on the first message (86). In some examples, telephone call controller 8 may route calls in accordance with both original routing 32 and new routing 34. In other examples, telephone call controller 8 may route calls in accordance with new routing 34 only.

Device 4 may determine whether device 4 is still in physical proximity to the second device (88). In some examples, device 4 may make this determination by periodically activating short-range communication device 10 and attempting to read from the similar apparatus of the second device (e.g., short-range communication device 14 of device 6). In other examples, Device 4 may detect movement of device 4 using motion detection sensor(s) 57 and make the determination based on this movement. In one such example, device 4 may obtain movement information from gyroscope 60. In other examples, device 4 may detect movement based on movement information from compass 58 or accelerometer 62. Then device 4 may activate short-range communication device 10 to attempt to communicate with short-range communication device 14. If short-range communication devices 10, 14 are able to communicate, then device 4 may still be in physical proximity to the second device ("YES" branch of 88). If short-range communication devices 10,14 are unable to communicate, then device 4 may determine that device 4 is no longer in physical proximity to the second device ("NO" branch of 88). In another example, device 4 may determine whether device 4 is still in physical proximity to the second device based on user input. In this example, a user of device 4 may interact with an input device 48 of device 4 and configure device 4 to operate as if device 4 is no longer in physical proximity to the second device whether or not device 4 is actually within physical proximity to the second device ("NO" branch of 88).

Responsive to determining that device 4 is no longer in physical proximity to the second device ("NO" branch of 88), device 4 may generate and send a second message to telephone call controller 8 (90). In some examples, the message may indicate that telephone call controller 8 is to configure itself to no longer route calls (e.g., incoming phone calls 30) to the second device while continuing to route incoming calls to device 4 (e.g., original routing 32). In other examples, telephone call controller 8 may cease routing incoming phone calls 30 to the second device and instead route incoming phone calls to device 4. The second message may also include a command which indicates that telephone call controller 8 is to determine if the second device is connected to an active telephone call. If the second device is connected to an active telephone call, telephone call controller 8 may connect device 4 to the active telephone call and then disconnect the second device from the active telephone call.

In response to receiving the second message from device 4, telephone call controller 8 may configure the routing of incoming phone calls 30 based on the second message (92). In some examples, telephone call controller 8 may route calls only in accordance with original routing 32 and no longer in accordance with new routing 34. Telephone call controller 8 may also determine whether the second device is connected to an active telephone call. If the second device is connected to an active telephone call upon telephone call controller 8 receiving the second message, telephone call controller 8 may attempt to connect device 4 to the active telephone call, and disconnect the second device from the active telephone call after device 4 has been connected.

Figure 4:
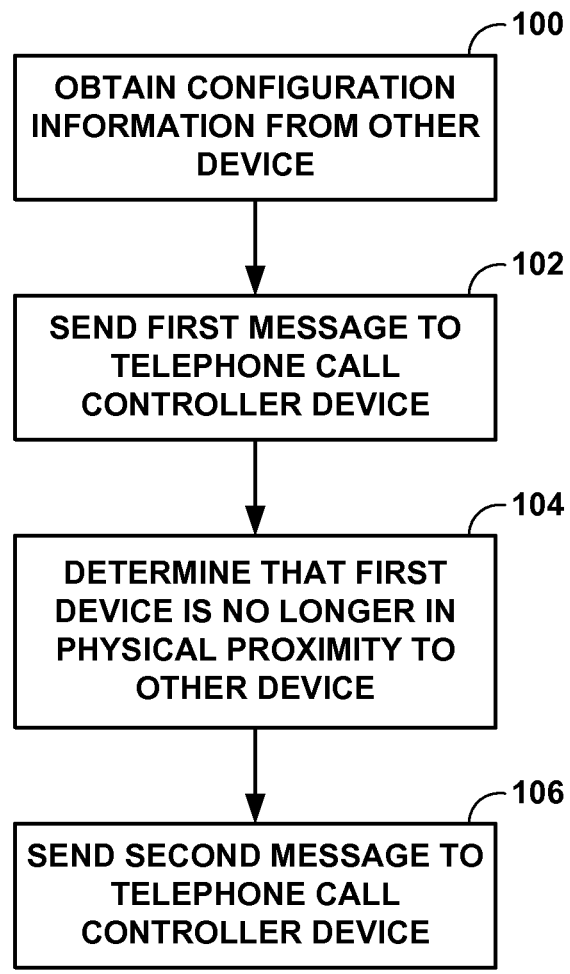
FIG. 4 is a flow diagram illustrating an example process for automatically configuring a telephone call controller to route incoming phone calls, in accordance with one or more aspects of the present disclosure.

FIG. 4 is a flow diagram illustrating an example process for automatically configuring a telephone call controller to route incoming phone calls, in accordance with one or more aspects of the present disclosure. For purposes of illustration only, the example method illustrated in FIG. 4 is described below within the context of system 2 of FIG. 1 and device 4 of FIG. 2. The example process illustrated in FIG. 4 may be performed by device 4 shown in FIGS. 1 and/or 2. The process of FIG. 4 includes obtaining, from a second device, configuration information associated with the second device using short-range wireless communication (100). The process of FIG. 4 also includes, responsive to obtaining the configuration information, sending a first message to a telephone call controller indicating that the telephone call controller is to configure incoming phone calls routed by the telephone call controller to be routed to at least the second device (102), wherein the first message includes at least a subset of the configuration information associated with the second device. The process further includes determining that device 4 is no longer in physical proximity to the second device (104). Additionally, the process includes sending a second message, in response to determining that device 4 is no longer in physical proximity to the second device, to the telephone call controller indicating that the telephone call controller is to configure the incoming phone calls routed by the telephone call controller to not be routed to the second device (106).

In one example, the process also includes determining that the first device is connected to an active telephone call, and sending the first message to the telephone call controller, wherein the first message includes a command to the telephone call controller to connect the second device to the active telephone call and disconnect the first device from the active telephone call after the second device is connected to the active telephone call.

In one example, the process also includes sending a second message to the telephone call controller, responsive to determining that the second device is no longer reachable by the first device using the short-range wireless communication, wherein the second message includes a command to the telephone call controller to determine whether the second device is connected to an active telephone call and, if so, connect the first device to the active telephone call and disconnect the second device from the active telephone call after the first device is connected to the active telephone call.

In one example, the configuration information includes a telephone number, a Media Access Control address, or Internet Protocol address of the second device. In one example, the short-range wireless communication operates in accordance with a near field communication protocol. In another example, the short-range wireless communication operates in accordance with a Bluetooth communication protocol.

In one example, the second device includes passive near field communication hardware configured to store the configuration information associated with the second device, and the first device includes active near field communication hardware configured to read from the passive near field communication hardware to obtain the configuration information. In another example, obtaining the configuration information by the first device includes activating a near field by the active near field communication hardware and obtaining the configuration information stored in the passive near field communication hardware of the second device. In one example, the passive near field communication hardware includes a near field communication sticker and the configuration information associated with the second device is programmed into the near field communication sticker.

In one example, determining that the second device is no longer reachable by the first device includes periodically activating near field communication hardware of the first device to read from passive near field communication hardware of the second device and determining that the first device can no longer reach the second device when the near field communication hardware of the first device is unable to read from the near field communication hardware of the second device. In another example, determining that the second device is no longer reachable by the first device includes detecting, by the first device, movement of the first device and, responsive to detecting the movement, activating near field communication hardware of the first device. Determining that the second device is no longer reachable by the first device further includes reading from passive near field communication hardware of the second device, and determining that the first device can no longer reach the second device when the near field communication hardware of the first device is unable to read the passive near field communication hardware of the second device.

In one example, detecting movement of the first device includes receiving information from a compass of the first device. In another example, detecting movement of the first device includes receiving information from a gyroscope of the first device. In a third example, detecting movement of the first device includes receiving information from an accelerometer of the first device.

In one example, the first device is only one of a plurality of devices to which the incoming phone calls are configured to be routed. In another example, the configuration information associated with the second device includes telephone numbers, Media Access Control addresses, or Internet Protocol addresses of a plurality of devices and the first message to configure incoming phone calls routed by the telephone call controller instructs the telephone call controller to configure incoming phone calls to be routed to at least the plurality of devices.

In one example, the first message to configure incoming phone calls routed by the telephone call controller instructs the telephone call controller to configure incoming phone calls to be routed at least to the second device and not be routed to the first device. Additionally, the second message to configure the incoming phone calls routed by the telephone call controller instructs the telephone call controller to configure incoming phone calls to be routed to at least the first device and not be routed to the second device. In another example, the process also includes receiving, responsive to the first message, a confirmation message from the telephone call controller and displaying the confirmation message to a user via one or more output devices of the first device.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A method comprising:
    determining, with a first computing device, that a second device is reachable by the first computing device using short-range wireless communication;
    determining, with the first computing device, whether the second device is no longer reachable by the first computing device using the short-range wireless communication;
    responsive to determining that the second device is no longer reachable by the first computing device using the short-range wireless communication, sending, by the first computing device and to a telephone call controller, a first message that includes a command to the telephone call controller to determine whether the second device is connected to an active telephone call; and
    responsive to determining that the second device is connected to the active telephone call, sending, by the first computing device and to the telephone call controller, a second message that includes a command to the telephone call controller to connect the first computing device to the active telephone call.

2. The method of claim 1, further comprising:
    responsive to determining that the second device is reachable by the first computing device using the short-range wireless communication, determining, with the first computing device, whether the first computing device is connected to the active telephone call; and
    prior to determining that the second device is no longer reachable by the first computing device using the short-range wireless communication and responsive to determining that the first computing device is connected to the active telephone call, sending, by the first computing device, a fourth message to the telephone call controller, wherein the fourth message includes a command to the telephone call controller to connect the second device to the active telephone call and disconnect the first computing device from the active telephone call after the second device is connected to the active telephone call.

3. The method of claim 1, wherein the second device includes passive near field communication hardware configured to store configuration information associated with the second device, and wherein the first computing device includes active near field communication hardware configured to read from the passive near field communication hardware to obtain the configuration information, the method further comprising:
obtaining, by the first computing device and from the second device, configuration information associated with the second device using the short-range wireless communication, wherein the first message comprises the configuration information.

4. The method of claim 3, wherein obtaining the configuration information comprises:
activating, by the first computing device, a near field by the active near field communication hardware; and
obtaining, by the first computing device, the configuration information stored in the passive near field communication hardware of the second device.

5. The method of claim 3,
wherein the passive near field communication hardware comprises a near field communication sticker, and
wherein the configuration information associated with the second device is programmed into the near field communication sticker.

6. The method of claim 1, wherein determining whether the second device is no longer reachable by the first computing device comprises:
periodically activating, by the first computing device, near field communication hardware of the first computing device to attempt to read passive near field communication hardware of the second device; and
determining, by the first computing device, that the first computing device can no longer reach the second device when the near field communication hardware of the first computing device is unable to read the passive near field communication hardware of the second device.

7. The method of claim 1, wherein determining whether the second device is no longer reachable by the first computing device comprises:
detecting, by the first computing device, movement of the first computing device;
responsive to detecting the movement, activating, by the first computing device, near field communication hardware of the first computing device to attempt to read passive near field communication hardware of the second device; and
determining, by the first computing device, that the first computing device can no longer reach the second device when the near field communication hardware of the first computing device is unable to read the passive near field communication hardware of the second device.

8. The method of claim 7, wherein detecting movement of the first computing device comprises receiving, by the first computing device, information from a compass of the first computing device.

9. The method of claim 7, wherein detecting movement of the first computing device comprises receiving, by the first computing device, information from a gyroscope of the first computing device.

10. The method of claim 7, wherein detecting movement of the first computing device comprises receiving, by the first computing device, information from an accelerometer of the first computing device.

11. The method of claim 1, further comprising:
responsive to receiving the indication that the second device is connected to the active telephone call displaying, by the first computing device, a confirmation message using one or more output devices of the first device.

12. The method of claim 1, wherein the first computing device is one of a plurality of devices to which the telephone call controller is configured to route incoming phone calls.

13. The method of claim 1, wherein the short-range wireless communication operates in accordance with a near field communication protocol.

14. The method of claim 1, wherein the short-range wireless communication operates in accordance with a bluetooth communication protocol.

15. The method of claim 3, wherein the configuration information comprises at least one of a telephone number, a Media Access Control address, and an Internet Protocol address.

16. A computer-readable storage medium comprising instructions that, when executed, cause one or more processors of a first computing device to perform operations comprising:
determining, with the first computing device, that a second device is reachable by the first computing device using short-range wireless communication;
determining, with the first computing device, whether the second device is no longer reachable by the first computing device using the short-range wireless communication;
responsive to determining that the second device is no longer reachable by the first computing device using the short-range wireless communication, sending, by the first computing device and to a telephone call controller, a first message that includes a command to the telephone call controller to determine whether the second device is connected to an active telephone call; and
responsive to determining that the second device is connected to the active telephone call, sending, by the first computing device and to the telephone call controller, a second message that includes a command to the telephone call controller to connect the first computing device to the active telephone call.

17. A computing device comprising:
at least one processor;
a telephonic interface configured to send and receive telephonic communications;
a short-range wireless communication interface; and
a telephony server configuration module,
wherein the short-range wireless communication interface is operable by the at least one processor to:
determine that a second device is reachable using short-range wireless communication,
determine whether the second device is no longer reachable using the short-range wireless communication, and
responsive to determining that the second device is no longer reachable using the short-range wireless communication, send an indication to the telephony server configuration module, and
wherein the telephone server configuration module is operable by the at least one processor to:
receive the indication from the short-range wireless communication interface, responsive to receiving the indication from the short-range wireless communication interface, send, to a telephone call controller, a first message that includes a command to the telephone call controller to determine whether the second device is connected to an active telephone call, responsive to determining that the second device is connected to the active telephone call, send, to the telephone call controller, a second message that includes a command to the telephone call controller to connect the telephonic interface to the active telephone call.

18. The computer-readable storage medium of claim 16, wherein determining whether the second device is no longer reachable by the first computing device comprises:

detecting, by the first computing device, movement of the first computing device;

responsive to detecting the movement, activating, by the first computing device, near field communication hardware of the first computing device to attempt to read passive near field communication hardware of the second device; and determining, by the first computing device, that the first computing device can no longer reach the second device when the near field communication hardware of the first computing device is unable to read the passive near field communication hardware of the second device.

19. The method of claim 1, further comprising, responsive to determining that the first device is connected to the active telephone call, sending, by the first device and to the telephone call controller, a third message that includes a command to the telephone call controller to disconnect the second device from the active telephone call.

20. The computing device of claim 17, wherein the indication is a first indication, the computing device further comprising:

near field communication hardware; and a motion detection module operable by the at least one processor to:

detect movement of the computing device, and responsive to detecting movement of the computing device, send a second indication to the short-range wireless communication interface, wherein the short-range wireless communication interface is further to:

receive the second indication from the motion detection module, responsive to receiving the second indication from the motion detection module, activate the near field communication hardware of the first computing device to attempt to read passive near field communication hardware of the second device, and determine that the second device is no longer reachable when the near field communication hardware is unable to read the passive near field communication hardware of the second device.

\* \* \* \* \*